United States Patent [19]

Lipp

[11] 4,271,572

[45] Jun. 9, 1981

[54] MACHINE TOOL HAVING AT LEAST ONE TOOL MAGAZINE

[75] Inventor: Willi Lipp, Witten-Annen, Fed. Rep. of Germany

[73] Assignee: Thyssen Industrie AG, Fed. Rep. of Germany

[21] Appl. No.: 16,074

[22] Filed: Feb. 28, 1979

[30] Foreign Application Priority Data

Mar. 20, 1978 [DE] Fed. Rep. of Germany ....... 2812200

[51] Int. Cl.³ .......................................... B23Q 3/157
[52] U.S. Cl. ................................. 29/26 A; 29/568; 408/35
[58] Field of Search .................. 29/26 A, 568; 408/35

[56] References Cited

U.S. PATENT DOCUMENTS

| 3,526,033 | 9/1970 | Saunders | 29/568 |
| 3,541,677 | 11/1970 | Fiegler | 29/568 |
| 3,962,777 | 6/1976 | Stoilov | 29/568 |

FOREIGN PATENT DOCUMENTS 1408131 10/1975 United Kingdom ...................... 29/568

Primary Examiner—Z. R. Bilinsky
Attorney, Agent, or Firm—McGlew and Tuttle

[57] ABSTRACT

A machine tool comprises a main support with a machine stand on the main support carrying a headstock alongside a workbench which is mounted advantageously for movement toward and away from the headstock. The construction includes a tool magazine support mounted on the main support and the tool magazine and the headstock are mounted for relative movement in two distinct planes. In addition, the tool magazine carries a rotatable tool magazine disk having a plurality of recesses in its periphery each of which accommodates a tool carrier. The tool magazine disk is supported by the rotation in a third plane distinct from the first and second planes, and cam means are provided between the tool carrier and the tool magazine disk which are effective to lock the carrier to the disk and/or to the headstock in accordance with whether the tool carrier with the tool is to be inserted on the headstock or to be stored in the tool carrier disk.

4 Claims, 12 Drawing Figures

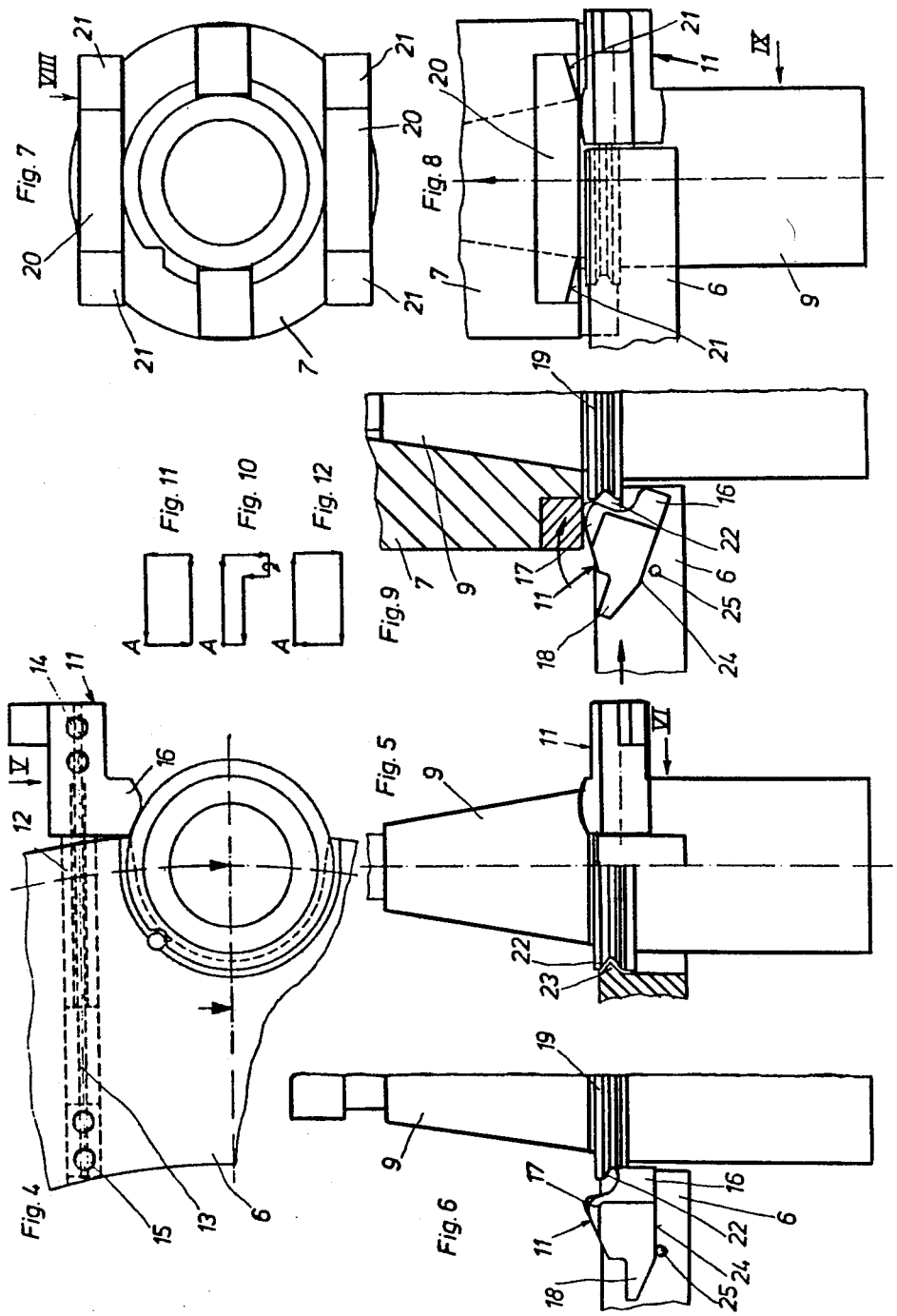

MACHINE TOOL HAVING AT LEAST ONE TOOL MAGAZINE

BACKGROUND OF THE INVENTION

1. Field of the Invention

This invention relates in general to machine tools and in particular to a new and useful machine tool with at least one tool magazine which has several substantially semicircular tool carriers and wherein the tool magazine is movable in two planes and rotatable in a third plane relative to the headstock containing the main spindle.

2. Description of the Prior Art

Known are machine tools whose magazines are disk-shaped and rotatable about their axis, but otherwise stationary. In these machine tools, a servicing device and a tool changing device are necessary for moving the tools out of the magazine into the main spindle.

Known are also machine tools which have no servicing device. Here then change of the tools from the magazine into the main spindle and vice versa is effected directly by a tool changing device.

A disadvantage of both machine tools is that an elaborate tool changing device is required for the tool changing operation. This means considerable expenditures for structural and functional elements, and the necessary electric and hydraulic control elements.

SUMMARY OF THE INVENTION

The invention is based on the problem of designing a machine tool of the above described type so that the tool magazine, in addition to its function of storing tools, can also take over the feeding and changing of tools with a minimum of control and time. Nevertheless the introduction of the tools into the tool carriers of the magazine and the removal should be possible in a simple manner without great effort, that is, by hand, and the locking of the tools in the magazine should be positive, that is, self-locking.

This problem is solved according to the invention in this way, that the tool magazine is movable in two planes, and rotatable in a third plane, and that each tool carrier has a locking element which can be rotated against the pressure of a spring. The operation of the locking element during the tool changing operation is force-locking during closing and form-locking during opening by the movement of the magazine in cooperation with a stop cam on the front end face of the main spindle. Due to the form-locking opening, the changing is effected with absolute reliability without any additional expenditure for electric, hydraulic or pneumatic switching and control devices. In loading and unloading the tool magazine, the locking element is turned in a simple manner by hand without any great effort and without any auxiliary tools.

For locking and unlocking the tool in the tool carrier, the locking element is provided with at least one locking cam and one swivel cam which are both staggered by about 90°.

In a further development of the invention, the surfaces of the locking cam and of the swivel cam facing each other form the free space necessary for loading and unloading the tool carrier.

In order to be able to turn the locking element by hand, e.g. when loading the individual storage places of the machine tool, the locking element according to the invention has an operating cam.

In order to hold the locking element safely in a locked position, it is held according to another feature of the invention in this position under initial stress of the spring by the locking element bearing against a stop with one surface perpendicular to the swivel plane under this initial stress of the spring. In this position, the locking cam is in front of a collar on the tool carrier.

According to the invention, the spring is formed of a spring bar whose one end is secured in the locking element and whose other end is secured in the tool magazine. For the automatic operation of the locking element during the tool changing operation, the invention suggests that the main spindle have at least one stop cam.

Accordingly, it is an object of the invention to provide a machine tool with at least one tool magazine which has several substantially semicircular storage places for storing tool carriers and wherein the tool magazine is movable in two planes and rotatable in a third plane, and each tool carrier has a locking element which can be rotated against the pressure of the spring.

A further object of the invention is to provide a machine tool which comprises a main support with a machine stand mounted on the main support which has a headstock with a main spindle and which includes a workbench on the main support adjacent the main spindle and including a tool magazine support mounted on the main support such that the headstock and the tool magazine are movable relatively in first and second distinct planes and further including a tool magazine carried on the tool magazine support and being rotatable in a third plane distinct from the first and second planes and wherein the tool magazine disk has a plurality of circumferentially extending tool storage recesses for storing a tool carrier for each tool and including spring biased locking cam means operatively associated with said tool carrier and the tool magazine disk for locking the tool carrier in a selected recess of the disk.

A further object of the invention is to provide a machine tool which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 4 is an enlarged detail of the machine tool, namely a storage place at IV in FIG. 1, FIG. 5 shows a view of the storage place of FIG. 4 in the direction of arrow V in FIG. 4;

FIG. 6 shows a partial side elevation of the storage place in the direction of arrow VI in FIG. 5;

FIG. 7 shows a view of the front end face of the main spindle;

FIG. 8 shows a partial top view of the main spindle with the magazine retracted in the direction of arrow VIII in FIG. 7;

FIG. 9 shows a side elevation of the main spindle, partly in a section in the direction of arrow IX in FIG. 8;

FIGS. 10-12 show working traverse of the magazine during the changing of a tool at the start and at the end of a machining operation.

GENERAL DESCRIPTION OF THE PREFERRED EMBODIMENT

Figure 1:
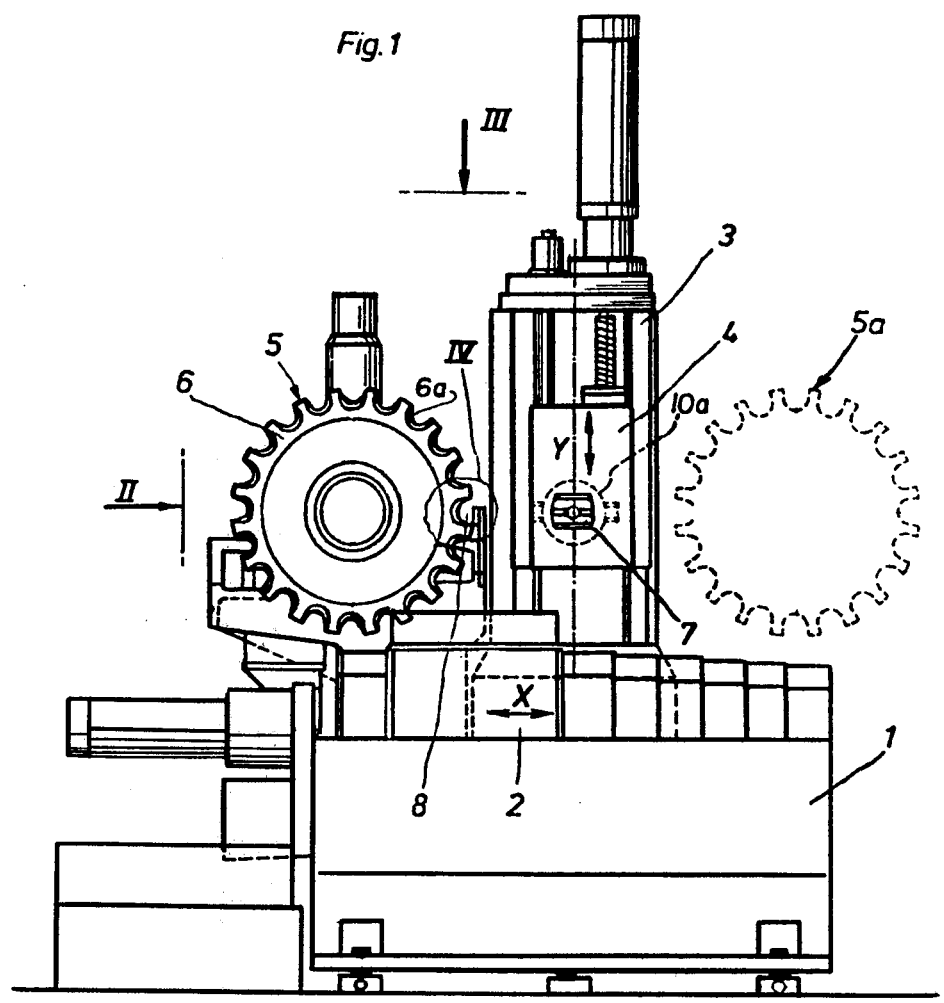
FIG. 1 is a front elevational view of a machine tool, constructed in accordance with the invention.

Referring to the drawings in particular, the invention embodied therein comprises a machine tool with at least one tool magazine 5 which has a plurality of substantially semicircular storing places 6a on a storage disk 6.

Figure 2:
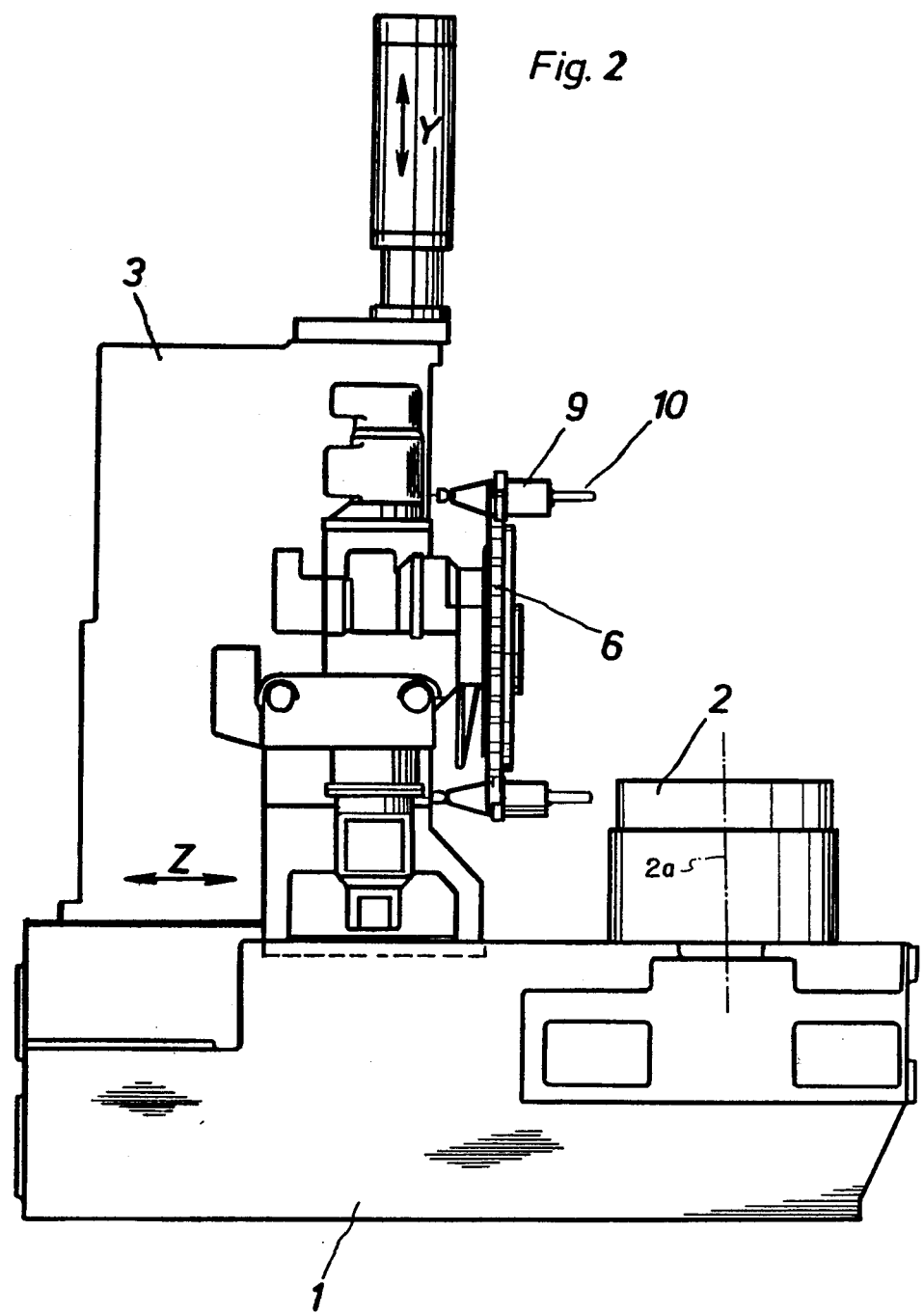
FIG. 2 shows the machine tool in a side elevation taken in the direction of arrow II in FIG. 1.
Figure 3:
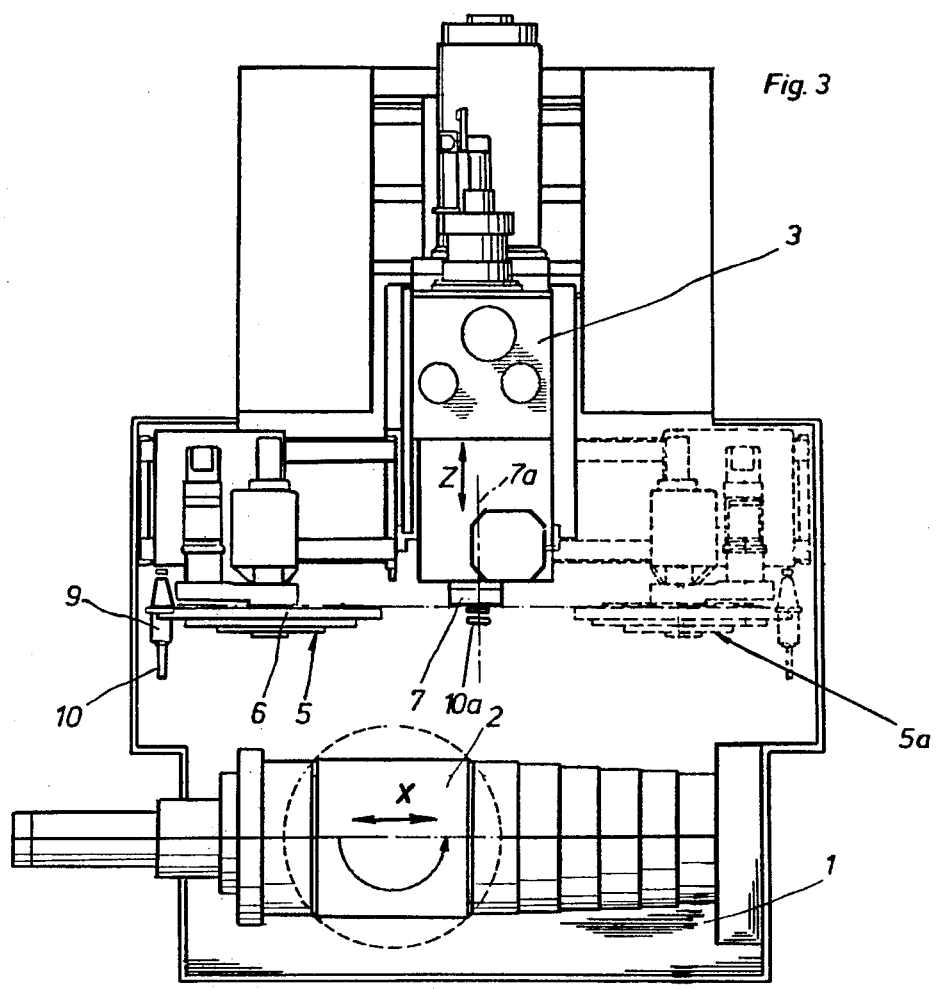
FIG. 3 shows a top view of the machine tool in the direction of arrow III in FIG. 1.

The machine tool according to FIGS. 1 to 3 includes a machine bed 1, workbench 2, which is movable in known manner in the longitudinal direction of the bench (x-direction), machine stand 3, which is movable in known manner on machine bed 1 in the direction of workbench 2 (z axis), headstock 4, which is movable on machine stand 3, likewise in a known manner in a vertical directions. Workbench 2 is also rotatable about its own axis 2a. Laterally of machine stand 3, a tool magazine 5 is so arranged that the axis about which a magazine disk portion 6 can be turned, extends parallel to a main spindle 7 in headstock 4. The invention is not confined to the arrangement of a tool magazine 5 next to machine stand 3. As shown in FIGS. 1 and 3 in broken lines, an additional tool magazine 5a which is independent of the above mentioned magazine, can be arranged on the opposite side of machine stand 3. Tool magazine 5 can be moved parallel to axis 7a of main spindle 7 (z-direction) and parallel to the direction of motion of workbench 2 (x-direction) and be rotated about its own axis.

On the circumference of magazine disk 6 are a arranged several storage place or recesses 8 to receive tool carriers 9 with tools 10. A view of a tool carrier in its storage place is shown in FIG. 4. On one side and in front of each storage place is arranged a locking element 11. Locking element 11 has on one side a journal 12 with which it is rotatably mounted in a radial bore of magazine disk 6 of tool magazine 5. Locking element 11 has in addition, centrally to journal 12, a bore which is engaged by one end of a spring bar designed as a spring 13. Spring 13 is rigidly connected with locking element 11 over screws 14. The other free end of spring 13 projecting from journal 12 of locking element 11 is rigidly connected over additional screws 15 with magazine disk 6 of tool magazine 5. Locking element 11 has a locking cam 16, a swivel cam 17, and a manual operating cam 18. In the locking position of locking element 11, locking cam 16 bears on a collar 19 of tool carrier 9 and prevents the removal of tool carrier 9 from storage place 8 (see FIGS. 5 and 6).

FIG. 7 shows the arrangement of two stop cams 20 on the end face of main spindle 7 above and below the tool 10. Stop cams 20 have bevels 21 on each side.

We will now describe the tool changing operation. We start from the consideration that a tool 10a is in main spindle 7 which was brought into a defined circumferential position for the tool change, in which the or both stop cams 20 extend horizontally, that is parallel to a line on which tool magazine 5 is brought to main spindle 7. Storage place 8 of magazine disk 6 which is opposite tool 10a in this position on the above described line is empty. From there tool 10a was removed and is returned again after completion of the machining operation. Machine stand 3 and headstock 4 have been moved in directions y and z into the tool-changing positions. For changing a tool, tool magazine 5 is moved in x-direction by an electromotor in known manner e.g. over a crank guide, toward main spindle 7, until the axis of tool 10 in storage place 8 coincides with the axis of main spindle 7. In the last portion of the path covered by tool magazine 5 with tool carrier 9 and tool 10, swivel cam 17 of locking element 11 run up on bevel 21 of stop cam 20, and locking element 11 is turned in time about its axis so far that locking cam 16 releases collar 19 of tool carrier 9. Collar 19 has a circumferential groove 22 which is engaged by a correspondingly shaped projection 23 in storage place 8, and which keeps the tool carrier axially and radially in connection with locking element 11. Groove 22 has in the present embodiment a trapezoidal form in accordance with VDI-guide line 2814, so that any tool can be inserted into tool magazine 5 according to the present invention. Tool carrier 9 and storage place 8 can also be designed in any other form, they only have to be adapted to each other.

After it has been detached in main spindle 7, tool magazine 5 is moved with tool carrier 9 and tool 10 in z-direction away from main spindle 7 in known manner, e.g. again by means of a crank guide. Locking cam 16 remains at first under the action of taut spring 13 in contact with stop cam 20, and locking element 11 turns about its axis until its stop surface 24 bears on a stop 25 in magazine disk 6. In this position the locking cam is in front of collar 19 of tool carrier 9, and locks thus tool carrier 9 with tool 10 in storage place 8 (see FIG. 6). The locking has thus been achieved immediately after the displacement of tool magazine 5 was started. A safe and firm locking hold in storage place 8 is thus always ensured.

When the tool carrier has left the main spindle in its entire length, the tool magazine is turned so far until tool 10 designed for the next machining operation is in front of main spindle 7. This rotation is effected likewise in known manner, and is therefore not described here.

Then tool magazine 5 is displaced in the direction of main spindle 7 and the new tool 10 is introduced into main spindle 7. Swivel cam 17, after touching stop cam 20, turns locking element 11 so far until locking cam 16 releases collar 19 of tool carrier 8. Tool 10 is chucked in main spindle 7, and tool magazine 5 returns in a right angle to the axis of main spindle 7 into its starting position. The free flow of locking element 11 for collar 19 of tool carrier 9 is maintained until swivel cam 17 has reached bevel 21 of the stop cam. From this point on, locking element 11 is turned back under the action of taut spring 13 until bearing surface 24 of locking element 11 bears on stop 25 in magazine disk 6. Bevel 21 starts only when a collision of locking cam 16 with collar 19 of tool carrier 9 is impossible due to the onsetting back-rotation of locking element 11. The movements of tool magazine 5 during the entire tool-changing operation are represented schematically in FIG. 10 in a top view.

FIG. 11 shows in the same representation the movements of tool magazine 5 with the use of the first tool 10 of a machining program, and FIG. 12 shows the movements necessary for removing and depositing the last tool 10 after completion of a machining program. The starting point is designated in each case with A.

While a specific embodiment of the invention has been shown and described in detail to illustrate the application of the principles of the invention, it will be understood that the invention may be embodied otherwise without departing from such principles.

What is claimed is:

1. A machine tool comprising, a tool magazine with at least one magazine disk having a plurality of substantially semi-circular storage recesses for storing tool carriers, each storage recess having a trapezoidal projection, at least one tool carrier having a collar with a circular trapezoidal groove engageable with said trapezoidal projection of at least one of said storage recesses, a single locking member pivotably mounted on said magazine disk in front of each of said storage recesses for locking and unlocking said at least one tool carrier to at least one of said storage recesses, said locking member pivotable about an axis extending parallel to a plane of said magazine disk, spring means connected to said locking member for biasing said locking member into a locking position thereof to lock said at least one tool carrier in said at least one storage recess, said locking member having a locking cam extending in front of said tool carrier collar when said tool carrier is locked in said storage recess, said locking member including a swivel cam for pivoting said locking member into an unlocking position thereof for moving said locking cam away from said tool carrier collar to release said tool carrier, a manual actuation cam for manually releasing said tool carrier from said storage recess extending in a direction opposite from said locking cam and connected to said locking member, said locking cam and manual actuation cam extending in a direction contained in a plane extending transverse to said axis, said swivel cam extending in a direction substantially perpendicular to the plane containing the extension direction of said locking and manual actuation cams, a machine stand having a headstock thereon and a main spindle on said headstock, said main spindle having a front end face which is adapted to receive the tool carrier and which face has at least one stop cam having side edges on each side with a bevel disposed in a position to contact said swivel cam of said locking element to pivot said locking element when said tool magazine is moved in a direction substantially parallel to said axis.

2. A machine tool according to claim 1 wherein said locking element bears in a locking position thereof with a surface thereof against a stop in said magazine disk.

3. A machine tool according to claim 1 wherein said spring means includes a spring engaged with said magazine disk comprising a spring bar having one end secured in said locking element and the other end secured in said magazine disk.

4. A machine tool according to claim 1, wherein surfaces of said locking cam and said swivel cam face each other and form a free space, said collar of said tool carrier extending into said free space when said tool carrier is locked.

* * * * *